United States Patent
Koshiba et al.

(10) Patent No.: US 11,435,197 B2
(45) Date of Patent: Sep. 6, 2022

(54) DRIVING ASSISTANCE SYSTEM, ROUTE GUIDANCE SYSTEM, DRIVING ASSISTANCE METHOD, AND DRIVING ASSISTANCE PROGRAM

(71) Applicants: AISIN CORPORATION, Kariya (JP); TOYOTA JIDOSHA KABUSHIKI KAISHA, Toyota (JP)

(72) Inventors: Sadahiro Koshiba, Takahama (JP); Kazuteru Maekawa, Miyoshi (JP); Seiji Takahata, Nishio (JP); Takahiro Yamaguchi, Okazaki (JP); Shingo Kinashi, Okazaki (JP); Yuji Sato, Owariasahi (JP); Hironobu Sugimoto, Nagoya (JP); Xin Jin, Nagoya (JP); Hiroaki Sakakibara, Nagoya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 16/637,977

(22) PCT Filed: May 28, 2018

(86) PCT No.: PCT/JP2018/020328
§ 371 (c)(1),
(2) Date: Feb. 10, 2020

(87) PCT Pub. No.: WO2019/039020
PCT Pub. Date: Feb. 28, 2019

(65) Prior Publication Data
US 2020/0173793 A1 Jun. 4, 2020

(30) Foreign Application Priority Data
Aug. 22, 2017 (JP) .............................. JP2017-159244

(51) Int. Cl.
G01C 21/34 (2006.01)
G08G 1/0962 (2006.01)
B60W 30/10 (2006.01)

(52) U.S. Cl.
CPC ..... *G01C 21/3415* (2013.01); *G08G 1/09626* (2013.01)

(58) Field of Classification Search
CPC ....... G01C 21/34; G01C 21/36; B60W 30/10; G09B 29/00; G09B 29/10
See application file for complete search history.

(56) References Cited

U.S. PATENT DOCUMENTS

2015/0112537 A1\* 4/2015 Kawamata ........... G05D 1/0061
701/23
2015/0369617 A1\* 12/2015 Ding .................. G01C 21/3415
701/428

(Continued)

FOREIGN PATENT DOCUMENTS

JP 2016-161456 A 9/2016

OTHER PUBLICATIONS

Aug. 21, 2018 Search Report issued in International Patent Application No. PCT/JP2018/020328.

*Primary Examiner* — Tan Q Nguyen
(74) *Attorney, Agent, or Firm* — Oliff PLC

(57) ABSTRACT

A driving assistance systems, methods, and programs are capable of communicating with a route guidance system that searches for a planned travel route of a vehicle and provides guidance on the planned travel route. The systems, methods, and programs accept, as input, the planned travel route from the route guidance system as a route for driving assistance and provide driving assistance of the vehicle on the route for driving assistance. The systems, methods, and programs accept, as input, when the planned travel route whose guidance is provided by the route guidance system no longer (Continued)

matches the route for driving assistance, the planned travel route from the route guidance system.

10 Claims, 2 Drawing Sheets

(56) References Cited

U.S. PATENT DOCUMENTS

2016/0252904 A1* 9/2016 Sakai ................. B60W 30/182
701/26
2016/0259814 A1 9/2016 Mizoguchi
2018/0340790 A1* 11/2018 Kislovskiy ......... G01C 21/3484
2018/0341571 A1* 11/2018 Kislovskiy ................ G06F 8/65

* cited by examiner

DRIVING ASSISTANCE SYSTEM, ROUTE GUIDANCE SYSTEM, DRIVING ASSISTANCE METHOD, AND DRIVING ASSISTANCE PROGRAM

TECHNICAL FIELD

Related technical fields include driving assistance systems, route guidance systems, driving assistance methods, and driving assistance programs.

BACKGROUND

There is known a map data processing device that uses a map database for route guidance and map display and a high-resolution map database for driving assistance control including self-driving (see JP 2016-161456 A). In JP 2016-161456 A, a function of providing route guidance and map display and a function of performing driving assistance control are implemented in a single map data processing device.

SUMMARY

When the function of providing route guidance and map display and the function of performing driving assistance control are implemented in a single map data processing device as in JP 2016-161456 A, a route whose guidance is provided matches a route whose driving assistance control is performed. However, when the function of providing route guidance and map display and the function of performing driving assistance control are implemented in different devices, a possibility that a route whose guidance is provided does not match a route whose driving assistance control is performed arises. When a route whose guidance is provided does not match a route whose driving assistance control is performed, a problem can occur, e.g., a direction in which a vehicle is allowed to actually travel by the driving assistance control does not match the direction of the vehicle whose guidance is provided.

Exemplary embodiments of the broad inventive principles described herein provide a technique enabling to perform processes for planned travel routes that match between a route guidance system and a driving assistance system.

Exemplary embodiments provide driving assistance systems, methods, and programs that are capable of communicating with a route guidance system that searches for a planned travel route of a vehicle and provides guidance on the planned travel route. The systems, methods, and programs accept, as input, the planned travel route from the route guidance system as a route for driving assistance and provide driving assistance of the vehicle on the route for driving assistance. The systems, methods, and programs accept, as input, when the planned travel route whose guidance is provided by the route guidance system no longer matches the route for driving assistance, the planned travel route from the route guidance system.

In the above-described configurations, the driving assistance system and the route guidance system are configured so as to be able to communicate with each other and so as to provide route guidance and driving assistance for a planned travel route. When a planned travel route whose guidance is provided by the route guidance system does not match a planned travel route whose driving assistance is provided by the driving assistance part, the planned travel route re-input part accepts, as input, the planned travel route whose guidance is provided by the route guidance system from the route guidance system, and thus, the planned travel route whose guidance is provided by the route guidance system and the planned travel route whose driving assistance is provided by the driving assistance system can be allowed to match each other.

In addition, to provide the above-described technique, a route guidance system that searches for a planned travel route of the vehicle and provides guidance on the planned travel route, outputs the planned travel route to the driving assistance system as a route for driving assistance; and re-outputs, when the planned travel route no longer matches the route for driving assistance provide to the driving assistance system, the planned travel route to the driving assistance system.

By thus configuring the route guidance system, too, a planned travel route whose guidance is provided by the route guidance system and a planned travel route whose driving assistance is provided by the driving assistance system can be allowed to match each other.

DETAILED DESCRIPTION OF EXEMPLARY EMBODIMENTS

Here, embodiments will be described in the following order:
(1) Configuration of a vehicle system;
(1-1) Configuration of a vehicle;
(1-2) Configuration of the route guidance system;
(1-3) Configuration of the driving assistance system;
(2) Driving assistance process; and
(3) Other embodiments.

Figure 1:
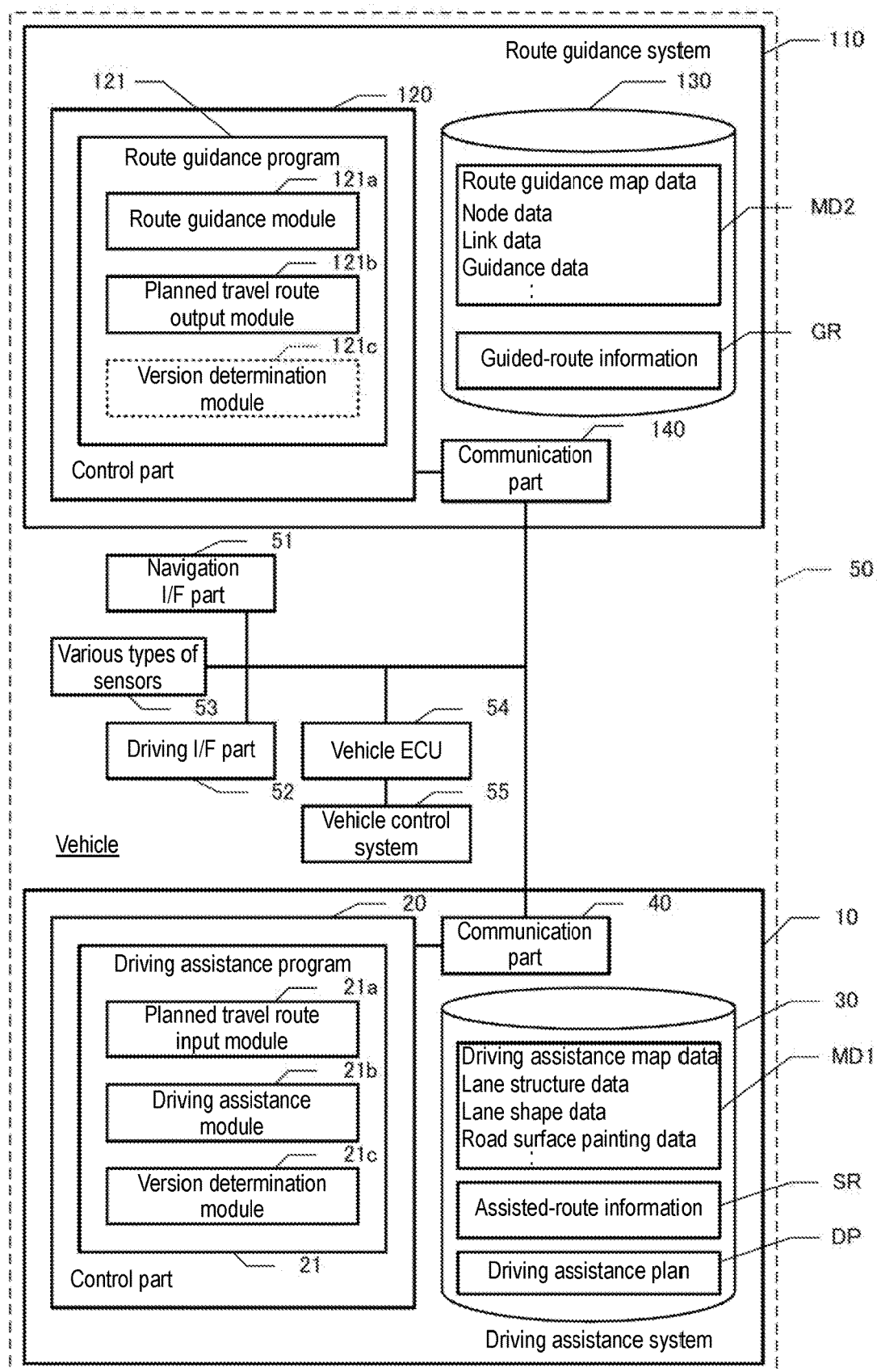
FIG. 1 is a block diagram of a vehicle system.

(1) Configuration of a Vehicle System (1-1) Configuration of a Vehicle:
FIG. 1 is a block diagram of a vehicle system. The vehicle system includes a vehicle 50 and a map provider 210. A driving assistance system 10 and a route guidance system 110 are mounted on the vehicle 50. The vehicle 50 includes a navigation I/F part 51, a driving I/F part 52, various types of sensors 53, a vehicle electronic control unit (ECU) 54, and a vehicle control system 55. The navigation I/F part 51 is a user interface for providing route guidance, and includes a touch panel display, various types of switches, a speaker, etc. The driving I/F part 52 is a device that performs operations related to driving (including self-driving) and outputs information about driving, and includes various types of operating parts such as a steering wheel, pedals, and a lever, and an output part for various types of information.

The vehicle ECU 54 is a computer for controlling the vehicle control system 55. Note that during manual driving, the vehicle ECU 54 controls the vehicle control system 55 in response to operations performed on the driving I/F part 52. On the other hand, during self-driving, the vehicle ECU 54 controls the vehicle control system 55 based on instructions from the driving assistance system 10. The vehicle control system 55 includes various types of actuators for accelerating, decelerating, and steering the vehicle 50.

The various types of sensors 53 are sensors for detecting the location, etc., of the vehicle 50, and include a GPS input part, a vehicle speed sensor, a gyro sensor, external cameras, etc. The current location of the vehicle 50 can be identified based on output signals from the GPS input part, the vehicle speed sensor, and the gyro sensor. The route guidance system 110 provides route guidance based on the current location of the vehicle 50. In addition, by performing an image recognition process on front and rear views of the vehicle 50 which are captured by the external cameras, a high-accuracy recognition location of the vehicle 50 can be obtained, and the route guidance system 110 performs self-driving based on the high-accuracy recognition location.

(1-2) Configuration of the Route Guidance System:

The route guidance system 110 searches for a planned travel route of the vehicle 50 based on route guidance map data MD2, and provides guidance on the planned travel route. To do so, the route guidance system 110 includes a control part 120, a recording medium 130, and a communication part 140. The control part 120 includes a CPU, a RAM, a ROM, etc., and executes a route guidance program 121 stored in the recording medium 130 or the ROM. The communication part 140 is a wired communication circuit for enabling the route guidance system 110 to communicate with the various parts 51 to 55 of the vehicle 50 and the driving assistance system 10. As a matter of course, the communication part 140 may be a wireless communication circuit.

The recording medium 130 records therein the route guidance map data MD2 and guided-route information GR. The route guidance map data MD2 includes node data, link data, and guidance data. Each node data mainly represents information about a divergence point. Specifically, node data represents the coordinates of a node corresponding to an intersection, and the shape of a divergence point. Each link data represents, for a link corresponding to a road section, various types of information such as a link ID, section length, travel time, and a speed limit. The road sections are units of a road divided at intersections that continue in a length direction. Nodes are present at both ends of a link. Note that a node to which three or more links are connected corresponds to a divergence point.

The link IDs are given so as to be unique to each link. The section length is the length of a road section. The link data includes shape interpolation point data. The shape interpolation point data is data representing the coordinates of a shape interpolation point which is set at the center in a width direction of a road section. The guidance data is data that stores audio, images, etc., used for route guidance.

The guided-route information GR is information indicating a guided route. The guided route refers to a planned travel route whose guidance is being provided by the route guidance system 110. The planned travel route includes a series of road sections that continuously connect a point of departure to a destination. The guided-route information GR is information indicating the link IDs of the series of road sections included in the planned travel route.

The route guidance program 121 includes a route guidance module 121a and a planned travel route output module 121b. The route guidance module 121a is a program module that causes the control part 120 serving as a computer to function as a route guidance part. The planned travel route output module 121b is a program module that causes the control part 120 to function as a planned travel route output part and a planned travel route re-output part.

By a function of the route guidance module 121a, the control part 120 searches for a planned travel route of the vehicle 50 based on the route guidance map data MD2, and provides guidance on the planned travel route. First, by the function of the route guidance module 121a, the control part 120 obtains a point of departure and a destination based on operations performed on the navigation I/F part 51, and searches for a planned travel route that connects the point of departure to the destination.

The control part 120 calculates a search cost on a per road section basis, and searches for a planned travel route with the smallest total value of the search costs. For example, the control part 120 may perform a route search by a publicly known technique such as Dijkstra's algorithm. By the function of the route guidance module 121a, the control part 120 records, in the recording medium 130, guided-route information GR indicating the searched planned travel route and the version of the planned travel route such that they are associated with each other, and provides guidance on the planned travel route based on the guided-route information GR. Hence, the planned travel route indicated by the guided-route information GR corresponds to a guided route. The version of the planned travel route is identification information given so as to be unique every time a planned travel route is searched for, and may, for example, indicate the cumulative number of times indicating how many times the route guidance system 110 has searched for the planned travel route, or indicate the search time for the planned travel route, or be a random number.

By the function of the route guidance module 121a, the control part 120 identifies the current location of the vehicle 50 on a road section by performing publicly known map matching on road sections defined in the route guidance map data MD2. The control part 120 allows the navigation I/F part 51 to output a screen and audio for providing guidance on the guided route, based on the current location of the vehicle 50.

When the current location of the vehicle 50 deviates from the guided route, by the function of the route guidance module 121a, the control part 120 performs rerouting. Namely, when the current location of the vehicle 50 deviates from the guided route, the control part 20 discards the guided-route information GR indicating the guided route, and searches for a planned travel route to the original destination, using the current location that deviates from the guided route as a new point of departure.

Then, the control part 20 records, in the recording medium 130, guided-route information GR indicating the planned travel route searched for by the rerouting, and provides guidance on the planned travel route as a new guided route. Note that the deviation of the current location of the vehicle 50 from the guided route refers to that the current location is not present on a road section included in the guided route, and may refer to, for example, a failure in map matching on road sections included in the guided route for a certain period or more.

By a function of the planned travel route output module 121b, the control part 120 outputs the planned travel route to the driving assistance system 10. Specifically, the control part 120 records guided-route information GR in the recording medium 130 every time a planned travel route is searched for, and outputs the guided-route information GR to the driving assistance system 10. That is, the control part 120 outputs guided-route information GR to the driving assistance system 10 every time a planned travel route is searched for. As a matter of course, when rerouting is performed, too, the control part 120 outputs guided-route information GR to the driving assistance system 10 every time a planned travel route is searched for, and thus, guided-route information GR indicating a guided route obtained after rerouting is outputted to the driving assistance system 10. Since the version of a planned travel route is given so as to be unique every time a planned travel route is searched for, the version of a guided route indicated by guided-route information GR obtained before rerouting differs from the version of a guided route indicated by guided-route information GR obtained after the rerouting.

When a guided route whose guidance is provided by the route guidance system 110 does not match an assisted route whose driving assistance is provided by the driving assistance system 10, by the function of the planned travel route output module 121b, the control part 120 outputs the guided route whose guidance is provided by the route guidance system 110 to the driving assistance system 10. In the present embodiment, it is configured such that when the versions of a guided route and an assisted route do not match each other, the driving assistance system 10 outputs a request for output of the guided route to the route guidance system 110.

Then, by the function of the planned travel route output module 121b, the control part 120 outputs, as a response to the request for output, guided-route information GR recorded in the recording medium 130 to the driving assistance system 10. In the present embodiment, the control part 120 outputs guided-route information GR to the driving assistance system 10 every time a planned travel route is searched for, and thus, outputs the same guided-route information GR as guided-route information GR having been outputted at least once in the past, to the driving assistance system 10 again.

In addition, when there is an inquiry about the version of a guided route from the driving assistance system 10, by the function of the planned travel route output module 121b, the control part 120 sends, as a response, the version of a guided route indicated by guided-route information GR recorded in the recording medium 130.

(1-3) Configuration of the Driving Assistance System:

The driving assistance system 10 creates a driving assistance plan of the vehicle on a planned travel route, based on driving assistance map data MD1. To do so, the driving assistance system 10 includes a control part 20, a recording medium 30, and a communication part 40. The communication part 40 is a wired communication circuit for enabling the driving assistance system 10 to communicate with the various parts 51 to 56 of the vehicle 50 and the route guidance system 110. As a matter of course, the communication part 40 may be a wireless communication circuit. The control part 20 includes a CPU, a RAM, a ROM, etc., and executes a driving assistance program 21 stored in the recording medium 30 or the ROM.

The recording medium 30 records therein the driving assistance map data MD1, assisted-route information SR, and a driving assistance plan DP. The driving assistance map data MD1 is map data that more specifically defines the shapes, etc., of each intersection and each road section than the route guidance map data MD2. Specifically, the driving assistance map data MD1 includes lane structure data, lane shape data, road surface painting data, etc. The lane structure data is data that defines, for each road section, the number of lanes, the construction status of an additional lane near an intersection, etc. The lane shape data is data that defines the width of a lane, the length of the lane, etc. The road surface painting data is data representing the location and meaning of painting applied to a road surface. The same road section is given a common link ID between the driving assistance map data MD1 and the route guidance map data MD2. The driving assistance plan DP indicates time-series target locations set on a planned travel route, and a target vehicle speed, a target acceleration rate, and a target steering angle for each target location.

The assisted-route information SR is information indicating an assisted route. The assisted route refers to a planned travel route whose driving assistance is provided by the driving assistance system 10. Note that when the driving assistance system 10 accepts, as input, guided-route information GR from the route guidance system 110, the driving assistance system 10 records the guided-route information GR as it is as assisted-route information SR in the recording medium 30. The driving assistance system 10 provides driving assistance for a planned travel route indicated by the assisted-route information SR which is recorded in the recording medium 30, and thus, the planned travel route indicated by the assisted-route information SR corresponds to an assisted route.

In the above-described configuration, the versions of planned travel routes indicated by guided-route information GR recorded in the recording medium 130 of the route guidance system 110 and indicated by assisted-route information SR recorded in the recording medium 30 of the driving assistance system 10 are basically identical. However, when the route guidance system 110 has not been able to normally output guided-route information GR to the driving assistance system 10, the versions of planned travel routes indicated by the guided-route information GR recorded in the recording medium 130 of the route guidance system 110 and indicated by assisted-route information SR recorded in the recording medium 30 of the driving assistance system 10 differ from each other. That is, the version of an assisted route whose driving assistance is provided by the driving assistance system 10 is older than the version of a guided route whose guidance is provided by the route guidance system 110. Note that when an abnormality has occurred in the driving assistance system 10, the route guidance system 110, or a communication channel therebetween, the route guidance system 110 becomes unable to normally output guided-route information GR to the driving assistance system 10.

The driving assistance program 21 includes a planned travel route input module 21a, a driving assistance module 21b, and a version determination module 21c. The driving assistance module 21b and the version determination module 21c are program modules that cause the control part 120 serving as a computer to function as a driving assistance part and a version determining part, respectively. The planned travel route input module 21a is a program module that causes the control part 120 to function as a planned travel route input part and a planned travel route re-input part.

By a function of the planned travel route input module 21a, the control part 20 accepts, as input, a planned travel route from the route guidance system 110. Specifically, by the function of the planned travel route input module 21a, the control part 20 accepts, as input, guided-route information GR indicating the link IDs of a series of road sections included in a guided route and the version of the guided route from the route guidance system 110. The control part 20 records the guided-route information GR as assisted-route information SR in the recording medium 30.

By a function of the driving assistance module 21b, the control part 20 provides driving assistance that allows the vehicle 50 to travel on the planned travel route, based on the driving assistance map data MD1. By the function of the driving assistance module 21b, the control part 20 obtains lane structure data and lane shape data corresponding to the link IDs of the road sections on an assisted route which is indicated by the assisted-route information SR recorded in the recording medium 30, and sets time-series target locations to which the vehicle 50 is allowed to travel on the road sections, based on the lane structure data and the lane shape data. In addition, the control part 20 sets a target vehicle speed, a target acceleration rate, and a target steering angle for each target location. The control part 20 creates a driving assistance plan DP indicating the time-series target locations and the target vehicle speed, target acceleration rate, and target steering angle for each target location.

By the function of the driving assistance module 21b, the control part 20 performs feedback control of the vehicle control system 55 so that the target vehicle speed, target acceleration rate, and target steering angle for each target location which are indicated by the driving assistance plan DP can be implemented. Specifically, the control part 20 obtains a high-accuracy recognition location of the vehicle 50 by performing an image recognition process on front and rear views of the vehicle 50 which are captured by the external cameras included in the various types of sensors 53, and performs feedback control of the vehicle control system 55 such that the high-accuracy recognition location approaches a target location indicated by the driving assistance plan DP. Likewise, the control part 20 performs feedback control of the vehicle control system 55 such that the actual acceleration rate and steering angle approach a target acceleration rate and a target steering angle which are indicated by the driving assistance plan DP. The control part 20 implements self-driving by outputting control data representing the amount of feedback control of the vehicle control system 55 to the vehicle ECU 54.

By a function of the version determination module 21c, the control part 20 determines whether the versions of a guided route whose guidance is provided by the route guidance system 110 and an assisted route whose driving assistance is provided by the driving assistance system 10 match each other, every time the vehicle 50 approaches a divergence point on the planned travel route. By the function of the version determination module 21c, the control part 20 determines whether a remaining distance from the current location of the vehicle 50 to a next divergence point on the assisted route indicated by the assisted-route information SR is less than or equal to a predetermined determination distance (e.g., 300 m). When the remaining distance to the next divergence point has reached less than or equal to the determination distance, the control part 20 determines whether the versions of the guided route and the assisted route match each other.

Specifically, when the remaining distance to the next divergence point on the planned travel route has reached less than or equal to the determination distance, the control part 20 inquires the route guidance system 110 about the version of the guided route. Then, the control part 20 determines whether the version of the guided route which is inputted from the route guidance system 110 as a response to the inquiry and the version of the assisted route indicated by the assisted-route information SR which is recorded in the recording medium 30 are identical. The versions being identical refers to that the versions match each other.

On the other hand, when the control part 20 cannot accept, as input, the version of a guided route whose guidance is provided by the route guidance system 110 from the route guidance system 110, by the function of the driving assistance module 21b, the control part 20 stops driving assistance for allowing the vehicle 50 to travel on the assisted route. Namely, when, despite the fact that the control part 20 has inquired the route guidance system 110 about the version of the guided route, the control part 20 does not receive, as a response, the version of the guided route from the route guidance system 110, the control part 20 stops driving assistance being provided. For example, when the version of the guided route is not received as a response even after the lapse of a predetermined time-out period from a time when an inquiry about the version of the guided route has been made, the control part 20 may determine that the version of the guided route is not received as a response from the route guidance system 110.

When the versions of a guided route whose guidance is provided by the route guidance system 110 and an assisted route whose driving assistance is provided by the driving assistance system 10 do not match each other, by the function of the planned travel route input module 21a, the control part 20 accepts, as input, the guided route whose guidance is provided by the route guidance system 110 from the route guidance system 110. When the versions of the guided route and the assisted route do not match each other, by the function of the planned travel route input module 21a, the control part 20 outputs a request for output of the guided route to the route guidance system 110. Then, the control part 20 accepts, as input, guided-route information GR which is received as a response to the request for output of the guided route, from the route guidance system 110. Then, when the guided-route information GR has been able to be inputted from the route guidance system 110, the control part 20 records the guided-route information GR as assisted-route information SR in the recording medium 30, and starts driving assistance for an assisted route indicated by the assisted-route information SR.

Furthermore, when the guided route whose guidance is provided by the route guidance system 110 does not match the assisted route whose driving assistance is provided by the driving assistance system 10, and the guided route whose guidance is provided by the route guidance system 110 cannot be inputted from the route guidance system 110, by the function of the driving assistance module 21b, the control part 20 stops driving assistance for allowing the vehicle 50 to travel on the guided route. Namely, when, despite the fact that the control part 20 has outputted a request for output of the guided route to the route guidance system 110, the control part 20 does not receive, as a response, guided-route information GR from the route guidance system 110, the control part 20 stops driving assistance being provided. For example, when the version of the guided route is not received as a response even after the lapse of a predetermined time-out period from a time when a request for output of the guided route has been made, the control part 20 may determine that the guided route cannot be inputted from the route guidance system 110.

In the present embodiment described above, when a guided route whose guidance is provided by the route guidance system 110 does not match an assisted route whose driving assistance is provided by the driving assistance system 10, the control part 20 of the driving assistance system 10 accepts, as input, the guided route from the route guidance system 110, and thus, the guided route whose guidance is provided by the route guidance system 100 and the assisted route whose driving assistance is provided by the driving assistance system 10 can be allowed to match each other. In addition, the control part 20 determines whether the versions of the guided route and the assisted route match each other, every time the vehicle approaches a divergence point on the planned travel route. By this, the versions of the guided route and the assisted route can be allowed to match each other upon approaching a divergence point, and thus, a possibility of the occurrence of a mismatch can be reduced, such as a road whose route guidance is provided after divergence differs from a road whose driving assistance is provided after the divergence.

In addition, it is configured such that the version of a guided route indicated by guided-route information GR which is obtained before rerouting differs from the version of a guided route indicated by guided-route information GR which is obtained after the rerouting. By this, a possibility can be reduced that while the route guidance system 110 provides guidance on a guided route obtained after rerouting, driving assistance for an assisted route which is searched for before the rerouting is provided.

It is configured such that when the control part 20 cannot accept, as input, the version of a guided route whose guidance is provided by the route guidance system 110 from the route guidance system 110, the control part 20 stops driving assistance for allowing the vehicle 50 to travel on an assisted route. By this, a possibility can be reduced that driving assistance continues in a situation in which the route guidance system 110 and the driving assistance system 10 are unable to communicate with each other or a situation in which at least one of the route guidance system 110 and the driving assistance system 10 is not operating normally.

It is configured such that when a guided route and an assisted route do not match each other and the guided route cannot be inputted from the route guidance system 110, the control part 20 stops driving assistance for allowing the vehicle 50 to travel on a guided route. By this, a possibility that in a situation in which a guided route does not match an assisted route, driving assistance for the unmatched route continues can be reduced.

(2) Driving Assistance Process

Figure 2:
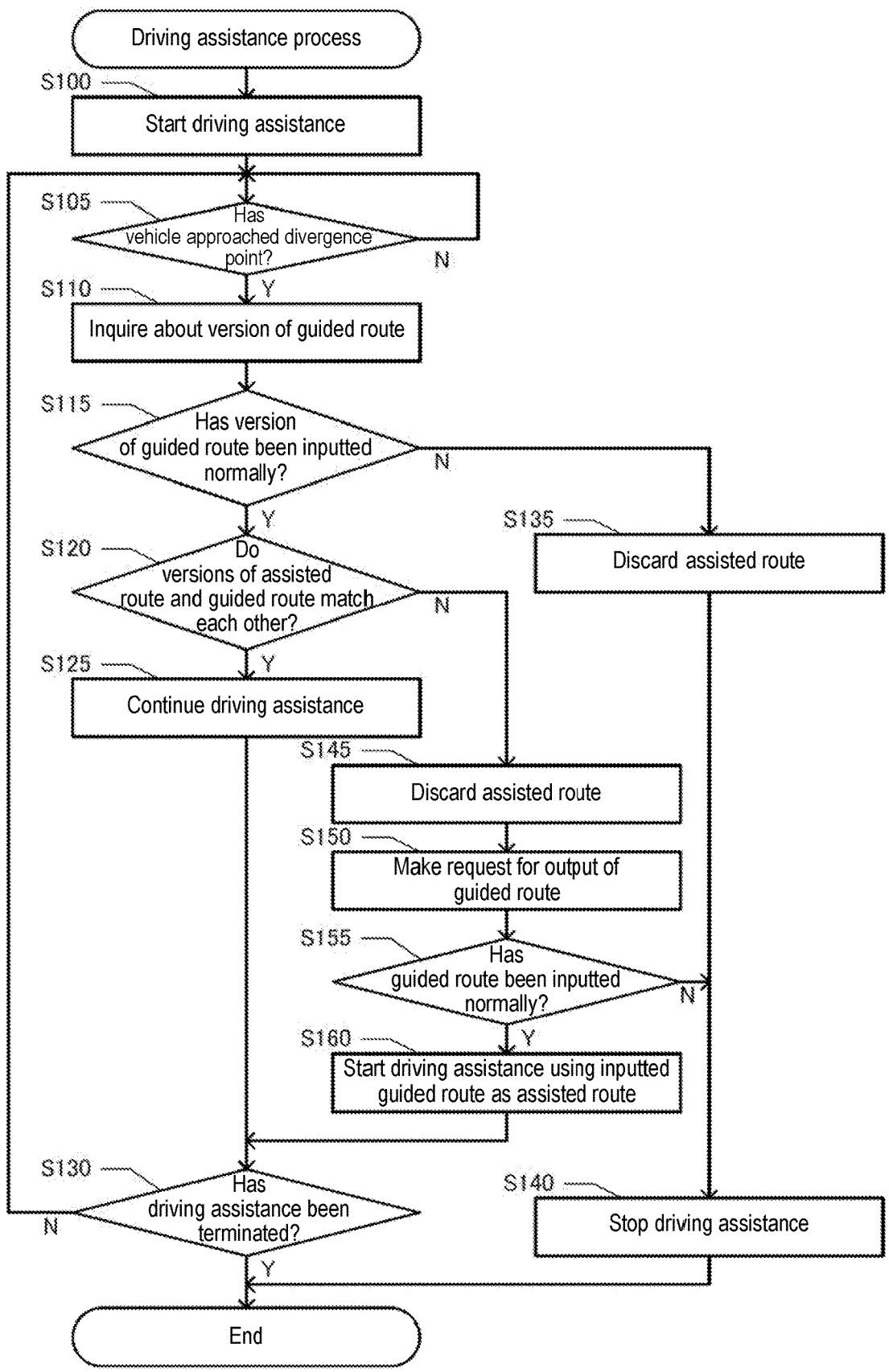
FIG. 2 is a flowchart of a driving assistance process.

Next, a driving assistance process performed by the driving assistance system 10 will be described. FIG. 2 is a flowchart of the driving assistance process. First, by the function of the driving assistance module 21b, the control part 20 starts driving assistance (step S100). Namely, the control part 20 accepts, as input, guided-route information GR from the route guidance system 110 and records the guided-route information GR as assisted-route information SR in the recording medium 30, and starts driving assistance for an assisted route indicated by the assisted-route information SR. At this time, in the route guidance system 110, guidance on a guided route indicated by the guided-route information GR is being provided.

Then, by the function of the version determination module 21c, the control part 20 determines whether the vehicle 50 has approached a divergence point (step S105). Namely, the control part 20 determines whether a remaining distance from the current location of the vehicle 50 to a next divergence point on the assisted route which is indicated by the assisted-route information SR is less than or equal to a predetermined determination distance (e.g., 300 m).

If it is not determined that the vehicle 50 has approached a divergence point (step S105: N), the control part 20 returns to step S105 and repeatedly performs step S105 until the vehicle 50 approaches a divergence point. On the other hand, if it is determined that the vehicle 50 has approached a divergence point (step S105: Y), by the function of the version determination module 21c, the control part 20 inquires about the version of the guided route (step S110). Namely, the control part 20 requests the route guidance system 110 to output the version of the guided route whose guidance is provided by the route guidance system 110.

Then, by the function of the version determination module 21c, the control part 20 determines whether the version of the guided route has been able to be inputted normally (step S115). Namely, the control part 20 determines whether the route guidance system 110 has normally responded to the inquiry about the version of the guided route and the driving assistance system 10 has been able to normally receive the version of the guided route normally.

If it is determined that the version of the guided route has been able to be inputted normally (step S115: Y), by the function of the version determination module 21c, the control part 20 determines whether the versions of the assisted route and the guided route match each other (step S120). Namely, the control part 20 determines whether the version of the guided route having been inputted normally from the route guidance system 110 and the version of the assisted route indicated by the assisted-route information SR which is recorded in the recording medium 30 are identical.

If it is determined that the versions of the assisted route and the guided route match each other (step S120: Y), by the function of the driving assistance module 21b, the control part 20 continues the driving assistance (step S125). Namely, driving assistance for the assisted route indicated by the assisted-route information SR which is originally recorded in the recording medium 30 continues.

Then, by the function of the driving assistance module 21b, the control part 20 determines whether the driving assistance has been terminated (step S130). The termination of the driving assistance includes, for example, that the vehicle 50 reaches the last target location defined in a driving assistance plan DP, a driver has switched to manual driving, or it becomes impossible to continue the driving assistance for a reason that, for example, the location of the vehicle 50 has been unable to be identified with high accuracy.

If it is determined that the driving assistance has been terminated (step S130: Y), by the function of the driving assistance module 21b, the control part 20 ends the driving assistance process. On the other hand, if it is not determined that the driving assistance has been terminated (step S130: N), by the function of the driving assistance module 21b, the control part 20 returns to step S105. Namely, the control part 20 waits for the vehicle 50 to approach a next divergence point while continuing the driving assistance for the assisted route indicated by the assisted-route information SR which is recorded in the recording medium 30.

Here, if it is not determined at step S115 that the version of the guided route has been able to be inputted normally (step S115: N), by the function of the driving assistance module 21b, the control part 20 discards the assisted route (step S135). Namely, the control part 20 deletes the assisted-route information SR recorded in the recording medium 30. Then, by the function of the driving assistance module 21b, the control part 20 stops the driving assistance (step S140). Namely, the control part 20 terminates self-driving and switches to manual driving. The control part 20 may inform the driver about the switching to manual driving.

In addition, if it is not determined at step S120 that the versions of the assisted route and the guided route match each other (step S120: N), by the function of the driving assistance module 21b, the control part 20 discards the assisted route (step S145).

Then, by the function of the planned travel route input module 21a, the control part 20 makes a request for output of a guided route (step S150). Namely, when the versions of the guided route and the assisted route do not match each other, the control part 20 outputs a request for output of a guided route to the route guidance system 110.

Then, by the function of the planned travel route input module 21*a*, the control part 20 determines whether a guided route has been able to be inputted normally (step S155). Namely, the control part 20 determines whether guided-route information GR has been able to be inputted normally from the route guidance system 110, as a response to the request for output of a guided route.

If it is determined that a guided route has been able to be inputted normally (step S155: Y), by the function of the driving assistance module 21*b*, the control part 20 starts driving assistance using the inputted guided route as an assisted route (step S160). Namely, when guided-route information GR has been able to be inputted normally from the route guidance system 110, the control part 20 records the guided-route information GR as assisted-route information SR in the recording medium 30, and starts driving assistance for an assisted route indicated by the assisted-route information SR. Note that the determination distance for determining an approach at step S105 is set such that timing at which step S160 is performed is earlier than the vehicle 50 reaching a divergence point. On the other hand, if it is not determined that a guided route has been able to be inputted normally (step S155: N), by the function of the driving assistance module 21*b*, the control part 20 stops the driving assistance (step S140).

(3) Other Embodiments

As indicated by a dotted line in FIG. 1, the control part 120 of the route guidance system 110 may execute a planned travel route output part that outputs a planned travel route to the driving assistance system, and a version determination module 121*c* that determines whether the versions of a guided route whose guidance is provided by the route guidance system 110 and an assisted route whose driving assistance is provided by the driving assistance system 10 match each other, every time the vehicle approaches a divergence point on a planned travel route. Namely, a determination as to whether the versions of a guided route and an assisted route match each other may be made by the route guidance system 110. In this case, the control part 120 of the route guidance system 110 inquires the driving assistance system 10 about the version of the assisted route. By the route guidance system 110 configured in this manner, too, the versions of a guided route whose guidance is provided by the route guidance system 110 and an assisted route whose driving assistance is provided by the driving assistance system 10 can be allowed to match each other.

Note that when the control part 20 cannot accept, as input, the version of a guided route whose guidance is provided by the route guidance system 110 from the route guidance system 110, the control part 20 does not necessarily need to stop driving assistance for allowing the vehicle 50 to travel on an assisted route. In addition, when the versions of a guided route and an assisted route do not match each other and the guided route cannot be inputted from the route guidance system 110, the control part 20 does not necessarily need to stop driving assistance for allowing the vehicle 50 to travel on a guided route. For example, in these cases, the control part 20 may provide guidance prompting the driver to switch to manual driving, instead of stopping driving assistance.

As long as the driving assistance system and the route guidance system can communicate with each other, communication means therebetween may be wired communication or wireless communication. In addition, the route guidance system may be implemented by a plurality of communicable devices, and a server may perform a route search and a device mounted on the vehicle may provide route guidance. The planned travel route input part accepts, as input, a planned travel route from the route guidance system by communication. The planned travel route is a route on which a vehicle which is a driving assistance target plans to travel. The planned travel route is a route connecting a point of departure to a destination, and may be identified by, for example, a series of road sections (links) connecting a point of departure to a destination.

As long as the driving assistance is driving assistance other than route guidance, the driving assistance may be performance of self-driving. In addition, the driving assistance may be, for example, calling for attention on a planned travel route or giving advice for reducing consumption of energy such as fuels and electric power. The self-driving may be assistance in acceleration or deceleration or may be assistance in steering.

A divergence point is a point where two or more road sections that the vehicle can exit are connected, and may be an intersection. Approaching a divergence point may refer to that a distance to the divergence point reaches less than or equal to a threshold value or that a period required to get to the divergence point reaches less than or equal to a threshold value. Note that it is desirable that the timing at which the planned travel route re-input part accepts, as input, a planned travel route again from the route guidance system be earlier than passage of a divergence point.

Planned travel routes matching each other may refer to that the version of a planned travel route whose guidance is provided by the route guidance system matches the version of a planned travel route whose driving assistance is provided by the driving assistance part. For example, the versions of planned travel routes matching each other may refer to that versions given to the planned travel routes are identical or that the planned travel routes themselves are identical. For example, the version determining part may consider that the versions of planned travel routes match each other, when the amounts of data representing the planned travel routes are identical. As a matter of course, the version determining part may consider that the versions of planned travel routes match each other, when time stamps such as search times for the planned travel routes are identical.

Furthermore, when a difference between the version of a planned travel route whose guidance is provided by the route guidance system and the version of a planned travel route whose driving assistance is provided by the driving assistance part is very small, the version determining part may determine that the planned travel routes match each other. For example, when, though versions differ from each other, there is only such a very small difference that does not affect driving assistance, the version determining part may determine that the version of a planned travel route whose guidance is provided by the route guidance system matches the version of a planned travel route whose driving assistance is provided by the driving assistance part.

Planned travel routes matching each other is not limited to that the version of a planned travel route whose guidance is provided by the route guidance system matches the version of a planned travel route whose driving assistance is provided by the driving assistance part, and a determination as to whether the planned travel routes match each other may be made using a matching determination technique for various types of data. For example, when the amount of data representing a planned travel route whose guidance is provided by the route guidance system matches the amount of data representing a planned travel route whose driving assistance is provided by the driving assistance part, it may be considered that the planned travel routes match each other. Furthermore, when the hash value of data representing a planned travel route whose guidance is provided by the route guidance system matches the hash value of data representing a planned travel route whose driving assistance is provided by the driving assistance part, it may be considered that the planned travel routes match each other.

The version determining part may determine whether the versions of a planned travel route whose guidance is provided by the route guidance system and a planned travel route whose driving assistance is provided by the driving assistance part match each other, every time the vehicle approaches a divergence point on the planned travel route. By this, the versions of planned travel routes can be allowed to match each other upon approaching a divergence point, and thus, a possibility of the occurrence of a mismatch can be reduced, such as a road whose route guidance is provided after divergence differs from a road whose driving assistance is provided after the divergence.

In addition, it may be configured such that the version of a planned travel route obtained before rerouting differs from the version of a planned travel route obtained after the rerouting. By this, a possibility can be reduced that while the route guidance system provides guidance on a planned travel route obtained after rerouting, driving assistance for a planned travel route obtained before the rerouting is provided. The rerouting refers to that a planned travel route is searched for again without changing a destination, and a point of departure may be changed, or search conditions such as distance-oriented and time-oriented may be changed. In addition, the rerouting may be performed in response to a user's operation or may be auto-rerouting in which when, for example, a current location deviates from a planned travel route, a planned travel route is searched for again using the deviated current location as a point of departure.

In addition, when the version of a planned travel route whose guidance is provided by the route guidance system cannot be inputted from the route guidance system, the driving assistance part may stop driving assistance of the vehicle on a planned travel route. By this, a possibility can be reduced that driving assistance continues in a situation in which the route guidance system and the driving assistance system are unable to communicate with each other or a situation in which at least one of the route guidance system and the driving assistance system is not operating normally.

Furthermore, when a planned travel route whose guidance is provided by the route guidance system does not match a planned travel route whose driving assistance is provided by the driving assistance part, and the planned travel route whose guidance is provided by the route guidance system cannot be inputted from the route guidance system, the driving assistance part may stop driving assistance of the vehicle on the planned travel route. By this, a possibility can be reduced that in a situation in which a planned travel route whose guidance is provided by the route guidance system does not match a planned travel route whose driving assistance is provided by the driving assistance system, driving assistance for the unmatched planned travel route continues.

Furthermore, a technique for allowing the versions of planned travel routes to match each other between the route guidance system and the driving assistance system can also be applied as a program or a method. In addition, a system, a program, and a method such as those described above may be implemented as a single device, or may be implemented by using a component shared with various parts included in the vehicle, and include various modes. It is possible to provide, for example, a navigation system or a driving assistance system that includes a device such as that described above, a method, or a program. In addition, changes can be made as appropriate, e.g., a part is software and a part is hardware. Furthermore, it is also feasible to provide a recording medium for a program that controls the device. (As used herein the term "recording medium" does not encompass transitory signals.) As a matter of course, the recording medium for software may be a magnetic recording medium or a magneto-optical recording medium, or even any recording medium to be developed in the future can also be considered exactly in the same manner.

The invention claimed is:

1. A driving assistance system capable of communicating with a route guidance system that searches for a planned travel route of a vehicle and provides guidance on the planned travel route, the driving assistance system comprising:
a processor programmed to:
accept, as input, the planned travel route from the route guidance system as a route for driving assistance;
provide driving assistance of the vehicle on the route for driving assistance; and
accept, as input, when the planned travel route whose guidance is provided by the route guidance system no longer matches the route for driving assistance, the planned travel route from the route guidance system as an updated route for driving assistance.

2. The driving assistance system according to claim 1, wherein the processor is programmed to:
determine that the planned travel route whose guidance is provided by the route guidance system matches the route for driving assistance, when versions of the planned travel route whose guidance is provided by the route guidance system and the route for driving assistance match each other.

3. The driving assistance system according to claim 2, wherein the processor is programmed to:
determine whether versions of the planned travel route whose guidance is provided by the route guidance system and the route for driving assistance match each other, every time the vehicle approaches a divergence point on the planned travel route.

4. The driving assistance system according to claim 2, wherein a version of the planned travel route obtained before rerouting differs from a version of a version of the planned travel route obtained after the rerouting.

5. The driving assistance system according to claim 2, wherein the processor is programmed to:
stop, when a version of the planned travel route whose guidance is provided by the route guidance system cannot be inputted from the route guidance system, the driving assistance of the vehicle on the route for driving assistance.

6. The driving assistance system according to claim 1, wherein when the processor is programmed to:
stop, when the planned travel route whose guidance is provided by the route guidance system no longer matches the route for driving assistance, and the planned travel route whose guidance is provided by the route guidance system cannot be inputted from the route guidance system, the driving assistance of the vehicle on the route for driving assistance.

7. The driving assistance system according to claim 1, wherein the processor is programmed to:
  discard, when the planned travel route whose guidance is provided by the route guidance system no longer matches the route for driving assistance, the route for driving assistance.

8. A route guidance system capable of communicating with a driving assistance system that creates a driving assistance plan of a vehicle on a planned travel route, the route guidance system comprising:
  a processor programmed to:
    search for a planned travel route of the vehicle and provides guidance on the planned travel route;
    output the planned travel route to the driving assistance system as a route for driving assistance; and
    re-output, when the planned travel route no longer matches the route for driving assistance provide to the driving assistance system, the planned travel route to the driving assistance system as an updated route for driving assistance.

9. A driving assistance method performed by a driving assistance system capable of communicating with a route guidance system that searches for a planned travel route of a vehicle and provides guidance on the planned travel route, the driving assistance method comprising:
  accepting, as input, the planned travel route from the route guidance system as a route for driving assistance;
  providing driving assistance of the vehicle on the route for driving assistance; and
  accepting, when the planned travel route whose guidance is provided by the route guidance system no longer matches the route for driving assistance, the planned travel route whose guidance is provided by the route guidance system from the route guidance system as an updated route for driving assistance.

10. A computer-readable storage medium storing a driving assistance program causing a computer to function as a driving assistance system capable of communicating with a route guidance system that searches for a planned travel route of a vehicle and provides guidance on the planned travel route, the driving assistance program causing the computer to perform functions comprising:
  accepting, as input, the planned travel route from the route guidance system as a route for driving assistance;
  providing driving assistance of the vehicle on the route for driving assistance; and
  accepting, as input, when the planned travel route whose guidance is provided by the route guidance system no longer matches the route for driving assistance, the planned travel route from the route guidance system as an updated route for driving assistance.

* * * * *